(12) United States Patent
Bowater et al.

(10) Patent No.: US 10,571,059 B2
(45) Date of Patent: Feb. 25, 2020

(54) HOSE CLAMP WITH POSITIONING FEATURES

(71) Applicant: IDEAL CLAMP PRODUCTS, INC., Smyrna, TN (US)

(72) Inventors: Bruce D. Bowater, Franklin, TN (US); Edwin T. Koehler, Smyrna, TN (US); Michael K. McKervey, Smyrna, TN (US)

(73) Assignee: IDEAL CLAMP PRODUCTS, INC., Smyrna, TN (US)

( * ) Notice: Subject to any disclaimer, the term of this patent is extended or adjusted under 35 U.S.C. 154(b) by 233 days.

(21) Appl. No.: 15/392,202

(22) Filed: Dec. 28, 2016

(65) Prior Publication Data

US 2017/0184237 A1 Jun. 29, 2017

Related U.S. Application Data

(60) Provisional application No. 62/271,885, filed on Dec. 28, 2015.

(51) Int. Cl.
*F16L 33/04* (2006.01)
*F16L 33/08* (2006.01)

(52) U.S. Cl.
CPC .................................. *F16L 33/08* (2013.01)

(58) Field of Classification Search
CPC ....................................................... F16L 33/04
USPC ................................................. 285/23, 252
See application file for complete search history.

(56) References Cited

U.S. PATENT DOCUMENTS

| 3,365,218 | A |   | 1/1968 | Denyes |
|---|---|---|---|---|
| 3,407,448 | A |   | 10/1968 | Tetzlaff |
| 3,454,996 | A |   | 7/1969 | Tetzlaff |
| 3,477,106 | A | * | 11/1969 | Tetzlaff ............... F16L 33/02 24/279 |
| 5,364,131 | A |   | 11/1994 | Hartsock et al. |
| 5,388,872 | A |   | 2/1995 | Campo |
| 5,405,170 | A |   | 4/1995 | Roulinson et al. |
| 5,407,236 | A |   | 4/1995 | Schwarz et al. |
| 5,616,205 | A |   | 4/1997 | Cogdill et al. |
| 5,749,603 | A |   | 5/1998 | Mann |
| 5,782,499 | A |   | 7/1998 | Gfrerer et al. |

(Continued)

OTHER PUBLICATIONS

International Search Report and Written Opinion issued in connection with International Application No. PCT/US2016/068821, dated May 4, 2017, 12 pages.

*Primary Examiner* — Robert Sandy
(74) *Attorney, Agent, or Firm* — Barnes & Thornburg LLP

(57) ABSTRACT

A hose clamp system is disclosed. The system includes a hose clamp and a retainer configured to attach the clamp to a hose substrate such that a desired radial, axial and circumferential position relative to the substrate outer diameter and hose end is maintained. The hose clamp includes an annular band including a radial inner surface facing toward a central axis and a radial outer surface positioned opposite the radial inner surface and a tension mechanism configured to tighten the annular band. The retainer includes an elongated body extending over the radial outer surface and a clip extending outward from the annular band that is configured to engage a hose substrate. The retainer is moveably coupled to the annular band such that the retainer is permitted to move circumferentially along the radial outer surface of the annular band.

20 Claims, 13 Drawing Sheets

(56) References Cited

U.S. PATENT DOCUMENTS

| | | |
|---|---|---|
| 5,860,760 A | 1/1999 | Kirk |
| 6,709,021 B2 | 3/2004 | Duncan et al. |
| 6,773,037 B2 | 8/2004 | Spurgat |
| 6,824,169 B2 | 11/2004 | Coffman |
| 6,832,786 B2 | 12/2004 | Duncan et al. |
| 6,863,312 B1 | 3/2005 | Liebst |
| 6,942,253 B2 | 9/2005 | Bowater |
| 7,108,291 B2 | 9/2006 | Baxi et al. |
| 7,302,741 B2 | 12/2007 | Bowater |
| 7,328,488 B1 | 2/2008 | Gallo |
| 7,490,862 B2 | 2/2009 | Sakazaki et al. |
| 7,761,962 B2 * | 7/2010 | Krauss .................... F16L 33/08 24/19 |
| 7,802,821 B2 * | 9/2010 | Rigollet .................... B25B 7/02 285/23 |
| 7,946,001 B2 | 5/2011 | Krauss |
| 8,060,991 B2 | 11/2011 | Rhyman et al. |
| 8,607,421 B2 | 12/2013 | Col et al. |
| 8,607,422 B2 | 12/2013 | Mohan et al. |
| 8,650,719 B2 | 2/2014 | Bowater |
| 8,677,571 B2 | 3/2014 | Bowater |
| 2002/0060453 A1 | 5/2002 | Spurgat |
| 2007/0035122 A1 | 2/2007 | Smith et al. |
| 2008/0098572 A1 * | 5/2008 | Krauss .................... F16L 33/08 24/19 |
| 2009/0139062 A1 | 6/2009 | Ryhman |
| 2009/0189389 A1 | 7/2009 | Brill et al. |
| 2010/0058563 A1 * | 3/2010 | Col ........................ F16L 33/08 24/279 |
| 2011/0005040 A1 | 1/2011 | Col |
| 2017/0184236 A1 | 6/2017 | Bowater |

\* cited by examiner

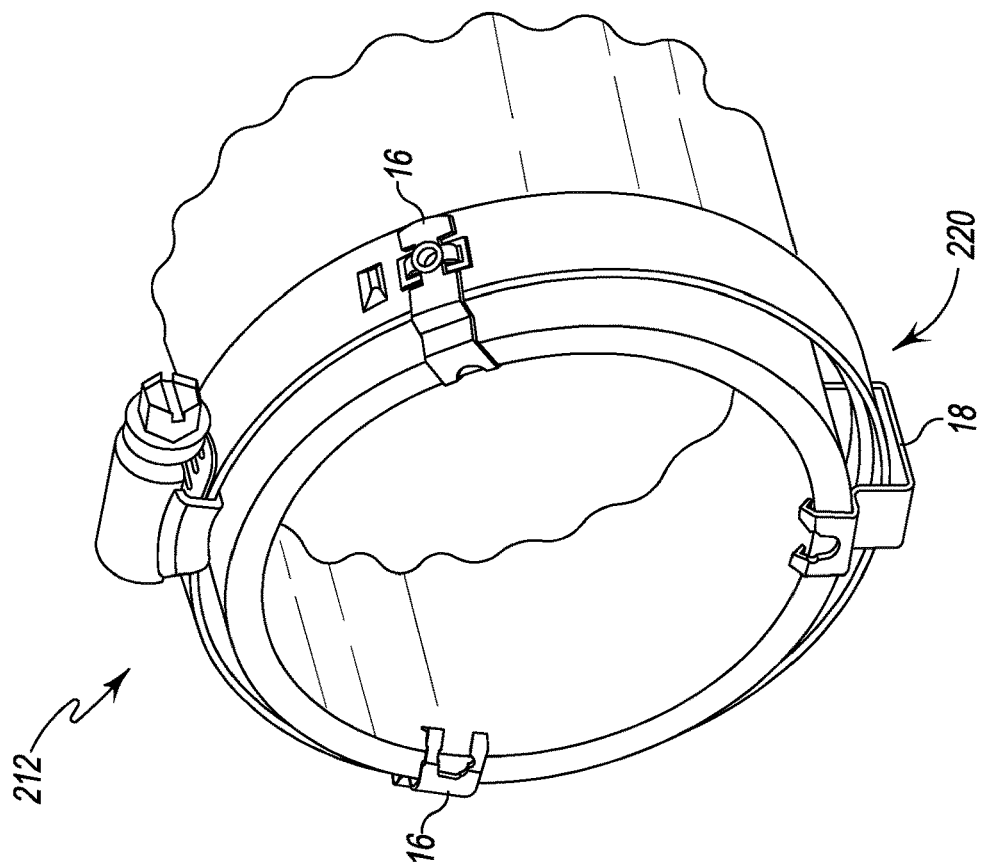
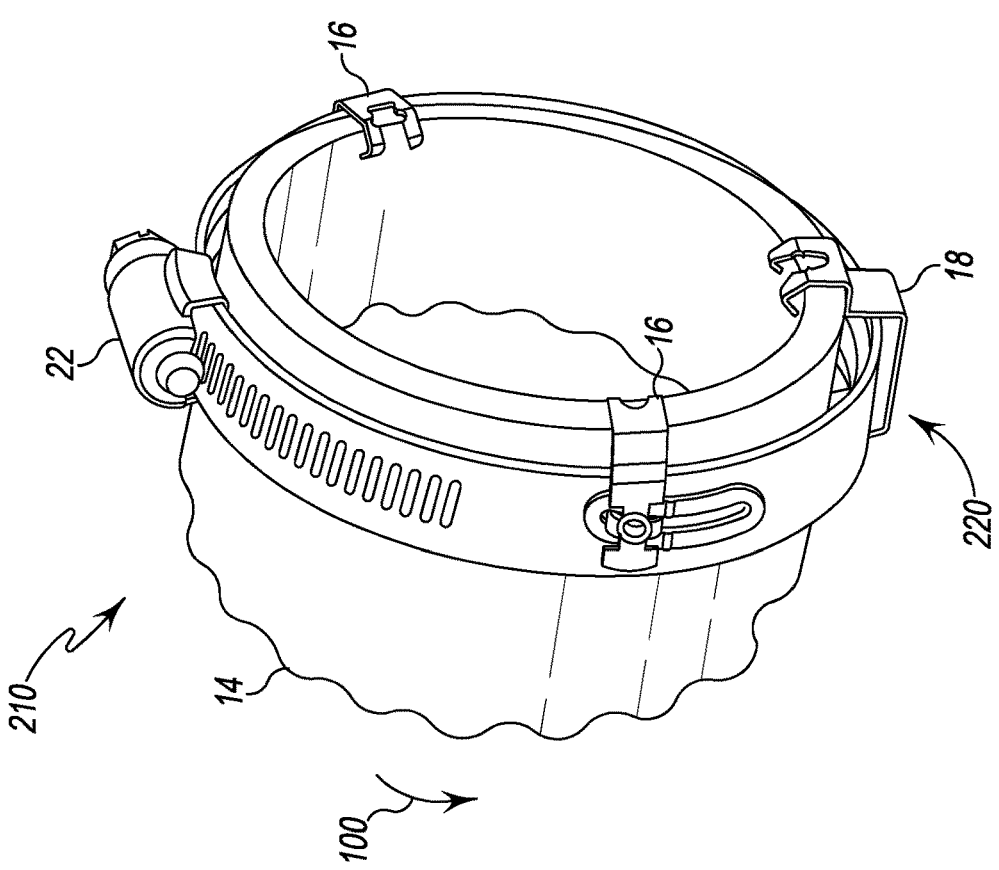

HOSE CLAMP WITH POSITIONING FEATURES

This application claims priority to U.S. Provisional Patent Application Ser. No. 62/271,885, which was filed on Dec. 28, 2015 and is expressly incorporated herein by reference.

BACKGROUND

The present disclosure relates to clamp designs and, more specifically, to a design for a hose clamp.

TECHNICAL FIELD

Hose clamps are commonly utilized to join together hoses and fittings or connectors, for example, within the automotive industry. Hose clamps may include a liner that may be spot welded, riveted, or otherwise fastened to a circular outer band and a locking mechanism to couple the ends of the outer band together and apply tension to the clamp. A radial load may be created by the tension and may be transmitted to the fittings of the joint as a radial load. Examples of hose clamps are shown and described in U.S. Pat. Nos. 8,650,719; 8,677,571; and 7,302,741, which are incorporated herein by reference.

Hose clamps may be sold to companies that supply hose or duct sub-assemblies to the end user. These sub-assemblies typically include a hose substrate and one or more clamps. The end user, such as, for example, an automobile manufacturer, may require the clamp to be semi-rigidly fixed to the hose in a pre-determined position to aid in the final assembly of the hose with other components. One way to semi-rigidly fix the clamp to the hose has been to position a fixation device between the clamp and the hose. One example of such a fixation device is shown and described in U.S. Pat. No. 7,946,001.

SUMMARY

According to one aspect of the disclosure, a hose clamp system includes a hose clamp and a retainer configured to attach the clamp to a hose substrate such that a desired radial, axial and circumferential position relative to the substrate outer diameter and hose end is maintained. The hose clamp comprises an annular band including a radial inner surface facing toward a central axis and a radial outer surface positioned opposite the radial inner surface, and a liner positioned radially inward from the annular band. The liner defines an inner diameter. The hose clamp also includes a tension mechanism configured to tighten the annular band and reduce the inner diameter of the liner. The retainer includes an elongated body extending over the radial outer surface and a clip extending outward from the annular band. The clip is configured to engage a hose substrate, and the retainer is moveably coupled to the annular band such that the retainer is permitted to move circumferentially along the radial outer surface of the annular band.

In some embodiments, the elongated body of the retainer may extend parallel to the central axis of the annular band. In some embodiments, the annular band may have an elongated slot extending through the radial outer surface. The retainer may include an alignment key that is received in the slot and is configured to move along the slot when the retainer is moved circumferentially along the radial outer surface of the annular band.

Additionally, in some embodiments, the system may further include an eyelet configured to retain the alignment key in the elongated slot. In some embodiments, the annular band may include a groove defined in the radial inner surface. The groove may be sized to receive an inner flange of the eyelet.

In some embodiments, the annular band may include a detent sized to retain the alignment key at an end of the elongated slot or other desired location within the slot. Additionally, in some embodiments, the detent may extend outwardly from the radial outer surface. In some embodiments, the detent may extend inwardly from a sidewall defining the slot.

In some embodiments, the hose clamp system may include a ramp block positioned between an end of the annular band and the retainer. The ramp block may be sized to prevent an opposite end of the annular band from engaging the retainer.

According to another aspect of the disclosure, a hose clamp system includes a hose clamp and a retainer configured to attach the clamp to a hose substrate such that a desired radial, axial and circumferential position relative to the substrate outer diameter and hose end is maintained. The hose clamp comprises an annular band including a radial inner surface facing toward a central axis and a radial outer surface positioned opposite the radial inner surface and a tension mechanism configured to tighten the annular band. The retainer includes an elongated body extending over the radial outer surface and a clip extending outward from the annular band. The clip is configured to engage a hose substrate, and the retainer is moveably coupled to the annular band such that the retainer is permitted to move circumferentially along the radial outer surface of the annular band.

According to another aspect, a method of attaching clamps to a hose substrate is the disclaimed. The clamps are attached such that a desired radial, axial and circumferential position relative to the hose outer diameter and hose end is maintained. The attachment method comprises attaching the clamp to the hose substrate with a retainer coupled to the outer circumference of the clamp such that circumferential movement of the clamp band relative to the underlying hose is permitted.

In some embodiments, attaching the clamp to the hose substrate may include engaging an eyeletted slide and multiple configurations of fixation clips. Additionally, in some embodiments, the method may also comprise using a detent and slot in the band of the clamp to position the retainer on the clamp band in such a way that the clamp can be shipped to the end user in an open diameter and position. In some embodiments, the band of the hose clamp is permitted to move circumferentially relative to the hose substrate.

According to another aspect, a hose clamp system comprises an annular band including a radial inner surface facing toward a central axis and a radial outer surface positioned opposite the radial inner surface, a tension mechanism configured to tighten the annular band, and a retainer. The retainer includes a liner positioned along the radial inner surface, and a fastener coupling the liner to the annular band. Relative circumferential movement between the annular band and the retainer is permitted.

In some embodiments, the annular band may have an elongated slot extending through the radial outer surface, and the fastener may extend through the slot and is configured to move along the slot when the retainer is moved relative to the annular band.

According to another aspect, a clamp system includes an annular band configured to engage a hose substrate. The annular band has an inner surface facing toward a central axis and an outer surface positioned opposite the inner surface. The clamp system also includes a guide bracket configured to be positioned over the annular band. The guide bracket includes an outer section, a first leg extending from a first end of the outer section, and a second leg extending from a second end of the outer section opposite the first end. The second end is configured to engage the hose substrate. The guide bracket further includes a channel defined by the outer section, the first leg, and the second leg, and a detent extending into the channel. The annular band is adjustable between a plurality of diameters including a first diameter in which a segment of the annular band is positioned in the channel between the detent and the outer section of the guide bracket, and a second diameter smaller than the first diameter in which the segment of the annular band is positioned in the channel between the detent and the hose substrate.

In some embodiments, the detent may be positioned on at least one of the first leg or second leg of the guide bracket and may extend away from at least one of the first leg or second leg toward the opposite leg. In some embodiments, the detent may be dome-shaped.

In some embodiments, the detent may include a first tab positioned on the first leg and the guide bracket further may include a second tab positioned on the second leg. In some embodiments, the guide bracket may include a plurality of detents. Additionally, in some embodiments, the detent may include a cantilevered tab extending from one of the first leg or second leg of the guide bracket.

In some embodiments, the second leg may extend from the second end of the outer section of the guide bracket to a lower end. The guide bracket may further include a clip extending from the lower end of the second leg and configured to engage the hose substrate. Additionally, in some embodiments, the first leg may extend from the first end of the outer section of the guide bracket to a lower end, and the guide bracket may further include a curved flange extending from the lower end of the first leg.

In some embodiments, the clamp system may further comprise a liner positioned radially inward from the annular band. The liner may define an inner diameter, and the clamp system may include a tension mechanism configured to tighten the annular band and reduce the inner diameter of the liner.

Additionally, in some embodiments, the clamp system may further comprise a retainer including an elongated body extending over the radial outer surface and a clip extending outward from the annular band, the clip being configured to engage a hose substrate. The retainer may be moveably coupled to the annular band such that the guide bracket is permitted to move circumferentially along the radial outer surface of the annular band.

In some embodiments, the clamp system may further comprise the hose substrate, which may include an inner surface facing toward the central axis and an outer surface facing toward the inner surface of the annular band. The hose substrate may be spaced apart from and extend circumferentially around the central axis and extends longitudinally parallel to the central axis.

According to another aspect, a guide bracket configured to be positioned over an annular band is disclosed. The guide bracket may include an elongated body including an outer section having a first end and a second end opposite the first end and a second leg extending from the second end of the outer section to a lower end of the second leg, a clip extending from the lower end of the second leg, the clip being configured to engage the hose substrate, a first leg extending from the first end of the outer section to a lower end of the first leg, and a curved flange extending from the lower end of the first leg. The guide bracket may further include a channel defined by the outer section, the first leg, and the second leg, and a detent extending into the channel.

In some embodiments, the detent may be positioned on at least one of the first leg or second leg of the guide bracket and may extend away from at least one of the first leg or second leg toward the opposite leg.

According to another aspect, a method of attaching a hose clamp to a hose substrate is disclosed. The method includes positioning an annular band of the hose clamp in a channel of a guide bracket defined by an outer section, a first leg, and a second leg, advancing the annular band over a detent positioned in the channel of the guide bracket, and attaching the guide bracket to the hose substrate. The detent maintains the annular band in a spaced apart configuration from the hose substrate.

In some embodiments, the method may include positioning the a segment of the annular band radially between the detent and the outer section of the guide bracket such that circumferential movement of the annular band relative to the underlying hose substrate is permitted.

In some embodiments, the method may comprise tightening the annular band to adjust the diameter of the band from a first diameter in which the segment of the annular band is positioned in the channel between the detent and the outer section of the guide bracket and a second diameter smaller than the first diameter in which the segment of the annular band is positioned in the channel between the detent and the hose substrate.

BRIEF DESCRIPTION OF THE DRAWINGS

The detailed description particularly refers to the following figures, in which:

FIG. 9 is a perspective view illustrating another hose clamp system attached to a hose substrate;

FIG. 10 is an opposing perspective view of FIG. 7;

DETAILED DESCRIPTION OF THE DRAWINGS

Figure 1:
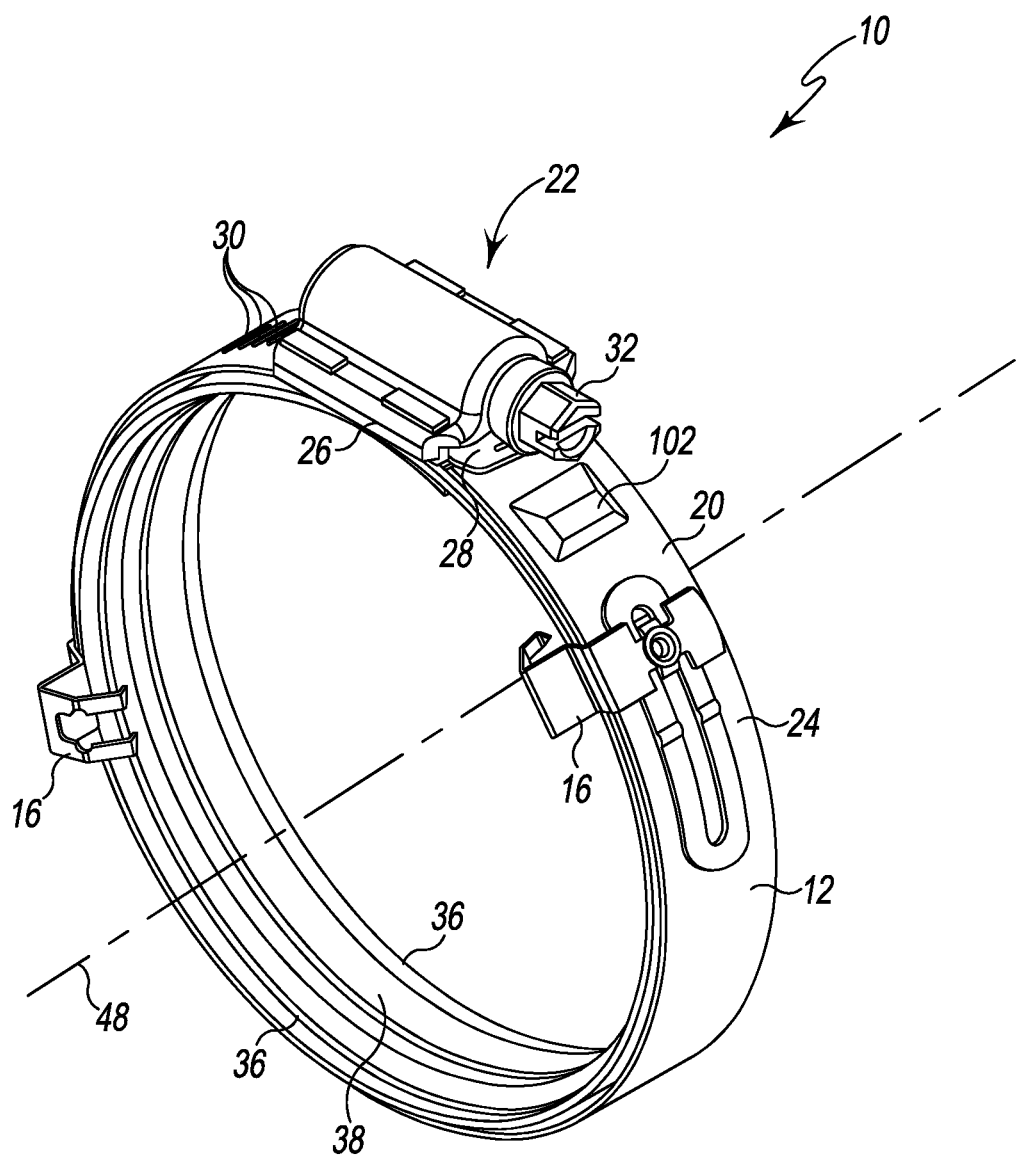
FIG. 1 is a perspective view illustrating one embodiment of a hose clamp system.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIGS. 1-5, one embodiment of a hose clamp system 10 that is configured to control the circumferential and axial position of a hose clamp 12 relative to a hose substrate 14 (such as an elastomeric or thermoplastic hose or duct) before final assembly with a spigot, fitting, or other component is shown. The hose clamp system 10 includes the clamp 12, a number of retainers 16 configured to position the hose clamp 12 on the substrate 14, and a number of guide brackets 18 configured to be positioned over the clamp 12 when clamp is attached to the hose substrate 14 (see FIG. 4). As shown in FIG. 1, the clamp 12 includes an outer band 20 and a locking mechanism 22 configured to apply tension to the outer band 20.

The outer band 20 is formed from a metallic material such as, for example, a stainless steel, titanium, aluminum, any ferrous material, and any non-ferrous material. The outer band 20 includes an elongated strip 24 that extends from an end 26 secured to the locking mechanism 22 to an opposite end 28. A number of slots 30 are defined in the strip 24 adjacent to the end 28. In the illustrative embodiment, the locking mechanism 22 is a typical screw-type tensioner that includes a screw 32 configured to engage the slots 30 defined in the band 20. The end 28 of the band 20 may be advanced into a slot defined between the tensioner 22 and the band 20 such that when the screw 32 of the tensioner is turned, the screw 32 engages the slots 30 to pull the end 28 of the band 20 through the slot to reduce the diameter of the clamp 12 and tighten the band 20 around the hose substrate 14. It should be appreciated that in other embodiments other tensioning or locking mechanisms may be used to tighten the band 20.

The clamp 12 also includes a spring liner 34 that is positioned within the band 20. As shown in FIG. 1, the spring liner 34 includes a pair of annular circumferential shoulders 36 engaged with the inner surface of the band 20 and a cylindrical central annular circumferential section 38 extending between the shoulders 36. In the illustrative embodiment, the section 38 is flat when viewed in an axial cross-section (see FIG. 4A). The spring liner 34 is illustratively formed as a single monolithic component from a metallic material such as, for example, a stainless steel, titanium, aluminum, any ferrous material, and any non-ferrous material. An exemplary spring liner 34 is shown and described in U.S. Pat. No. 8,650,719.

In the illustrative embodiment of FIGS. 1-5, the clamp system 10 includes a pair of retainers 16 positioned on opposite sides of the tensioner 22. It should be appreciated that in other embodiments the clamp system 10 may include additional retainers spaced apart around the circumference of the clamp 12. In still other embodiments, the system 10 may include only a single retainer with additional guide brackets. As described in greater detail below, the retainers 16 are configured to attach the band 20 to the hose substrate 14 such that the band 20 is permitted to move independently from the underline substrate 14.

Figure 2:
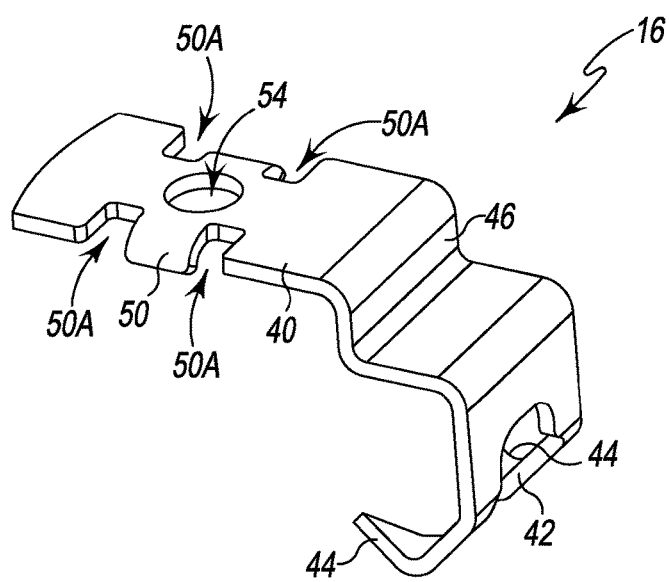
FIG. 2 is a perspective view illustrating a retainer of the hose clamp system of FIG. 1.
Figure 3:
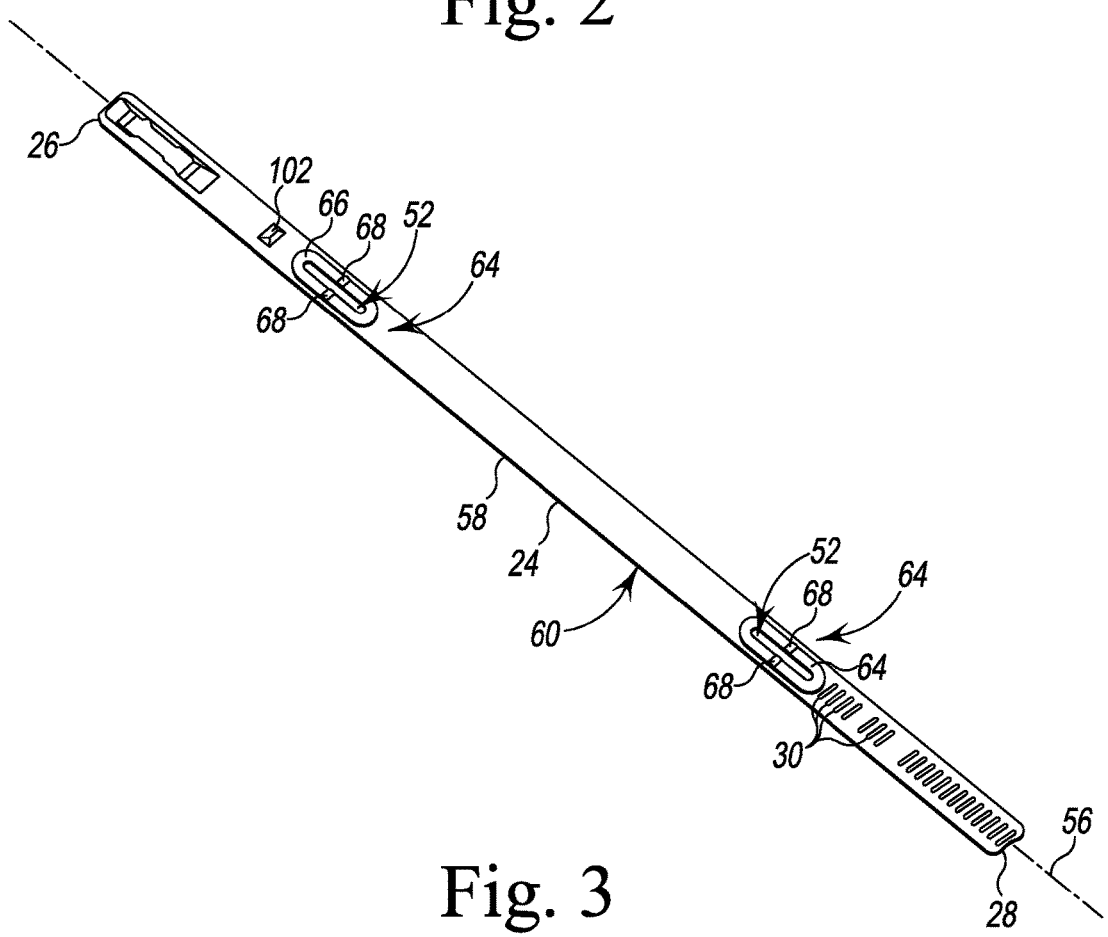
FIG. 3 is a perspective view illustrating an outer band of the hose clamp of FIG. 1.

Referring now to FIG. 2, each retainer 16 includes an elongated body 40 formed from a strip of metallic material such as, for example, a stainless steel or aluminum. The elongated body 40 is L-shaped in the illustrative embodiment and is configured to wrap around an end of the hose substrate 14. The retainer 16 includes a clip 42 configured to secure the retainer 16 to the hose substrate 14. In the illustrative embodiment, the clip 42 includes a pair of pointed tips 44 extending from a leg 46 of the elongated body 40 to engage the hose substrate 14 and attach the retainer 16. It should be appreciated that by changing the length of the leg 46, it is possible to control the radial positioning of the clamp relative to the central axis of the substrate 14. The radial position can vary from allowing the liner the be in contact with the underlying hose or duct, allowing for maximum clearance to any predetermined position of the clamp relative to the hose ranging from concentric to an infinite number of opposite min/max locations along the circumference.

At the opposite end of the retainer body 40, a pair of alignment keys 50 extend outwardly from the body 40. Each key 50 is sized and shaped to be received in an elongated slot 52 defined in band 20. In the illustrative embodiment, each key 50 is formed or bent downward to allow it to be received in the slot 52. A channel 50a defined on each side of each key 50 permits each key to be formed or bent downward. Each channel 50a also decreases the cross-sectional stiffness of the body 40, thereby permitting bending of the body 40 during clamp run down or installation so as to permit the retainer 16 to advance over the detents 68, which are described in greater detail below. A bore 54 is defined in the elongated body 40 between the keys 50 and is sized to receive an eyelet, rivet, or other fastener.

As described above, the band 20 includes an elongated strip 24 that extends from an end 26 to an opposite end 28. When assembled with the tensioner 22, the strip 24 is curled around an axis 48 to form the clamp's annular band. As shown FIG. 3, before assembly, the strip 24 has a longitudinal axis 56 that extends through the ends 26, 28 and a planar outer surface 58. Another inner surface 60 is positioned opposite the outer surface 58. The strip 24 also includes a pair of slots 52 that are positioned near opposite ends 26, 28 of the elongated strip 24. Each slot 52 extends along the longitudinal axis 56 of the strip 24 and hence extends circumferentially when the strip 24 is curled to form the annular band 20.

In the illustrative embodiment, each slot 52 is defined in a section 64 of the strip 24 having a surface 66 that is raised above the outer surface 58. Opposite each surface 66, a groove 62 (see FIG. 4A) is defined in the inner surface 60 of the strip 24. Each section 64 also includes a pair of detents 68 extending outwardly from the surface 66 on each side of the slot 52. As described in greater detail below, the detents 68 are configured to maintain the retainer 16 in a desired position prior to tensioning of the clamp 12. It should be appreciated that the detents may be symmetrical about the slot or may be positioned on the side of the slot closest to the clip (described in greater detail below).

Figure 4:
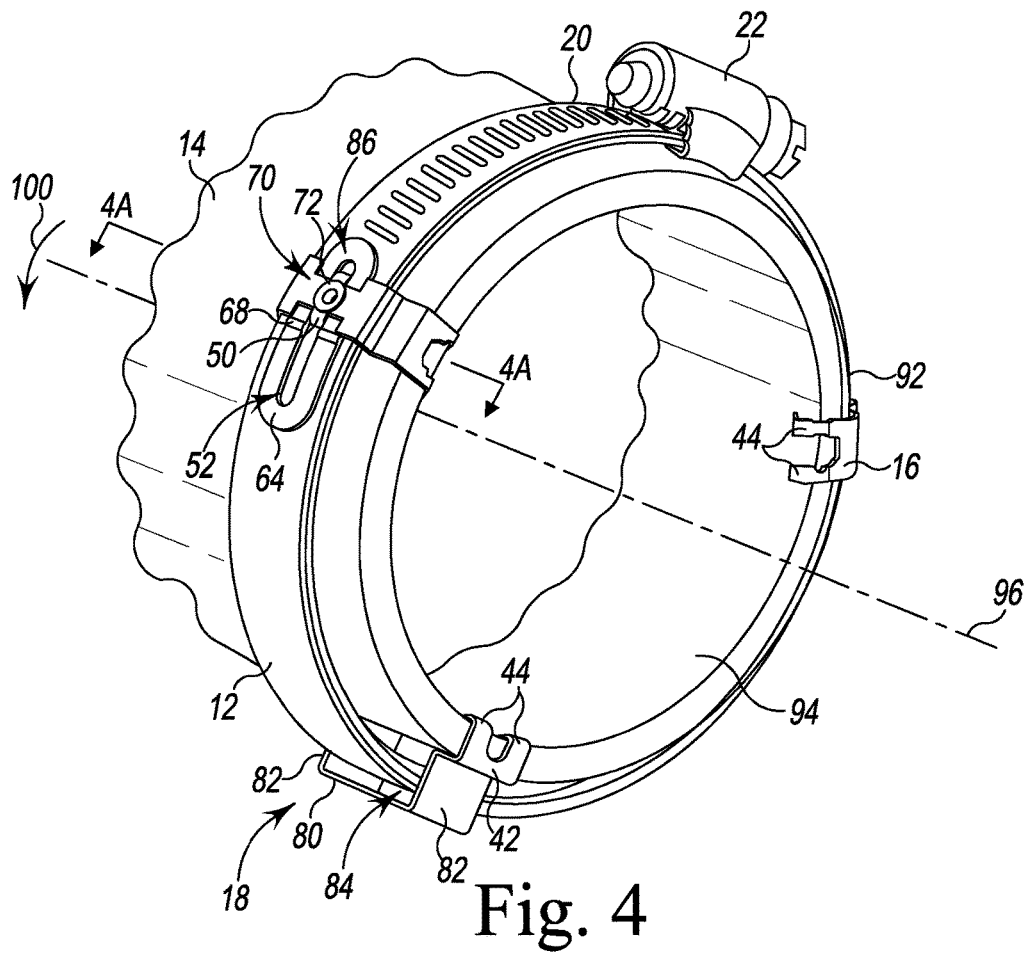
FIG. 4 is a perspective view illustrating the hose clamp system of FIG. 1 attached to a hose substrate.
Figure 4A:
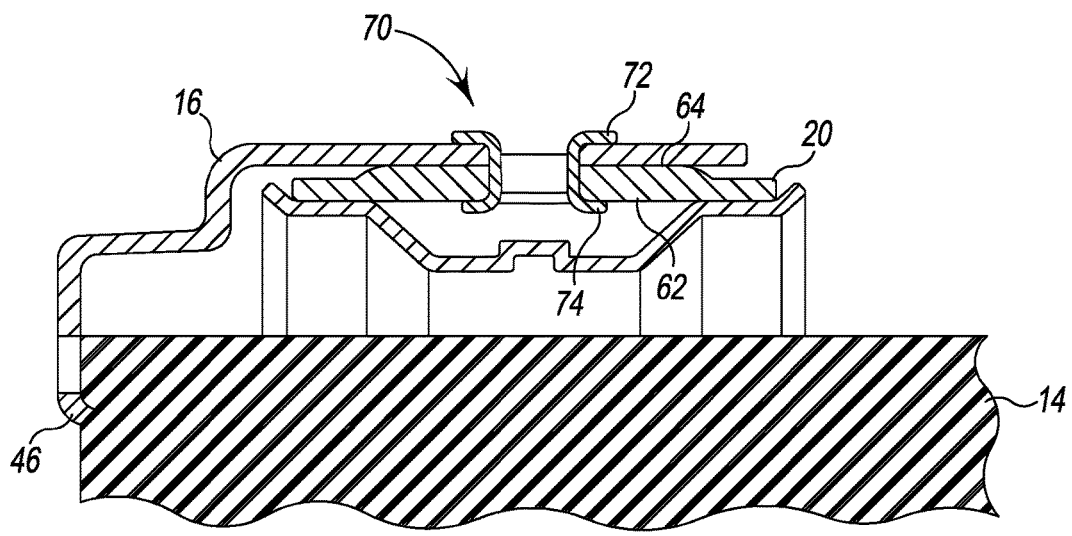
FIG. 4A is a cross-sectional view taken along the line 4A-4A of FIG. 4.
Figure 5:
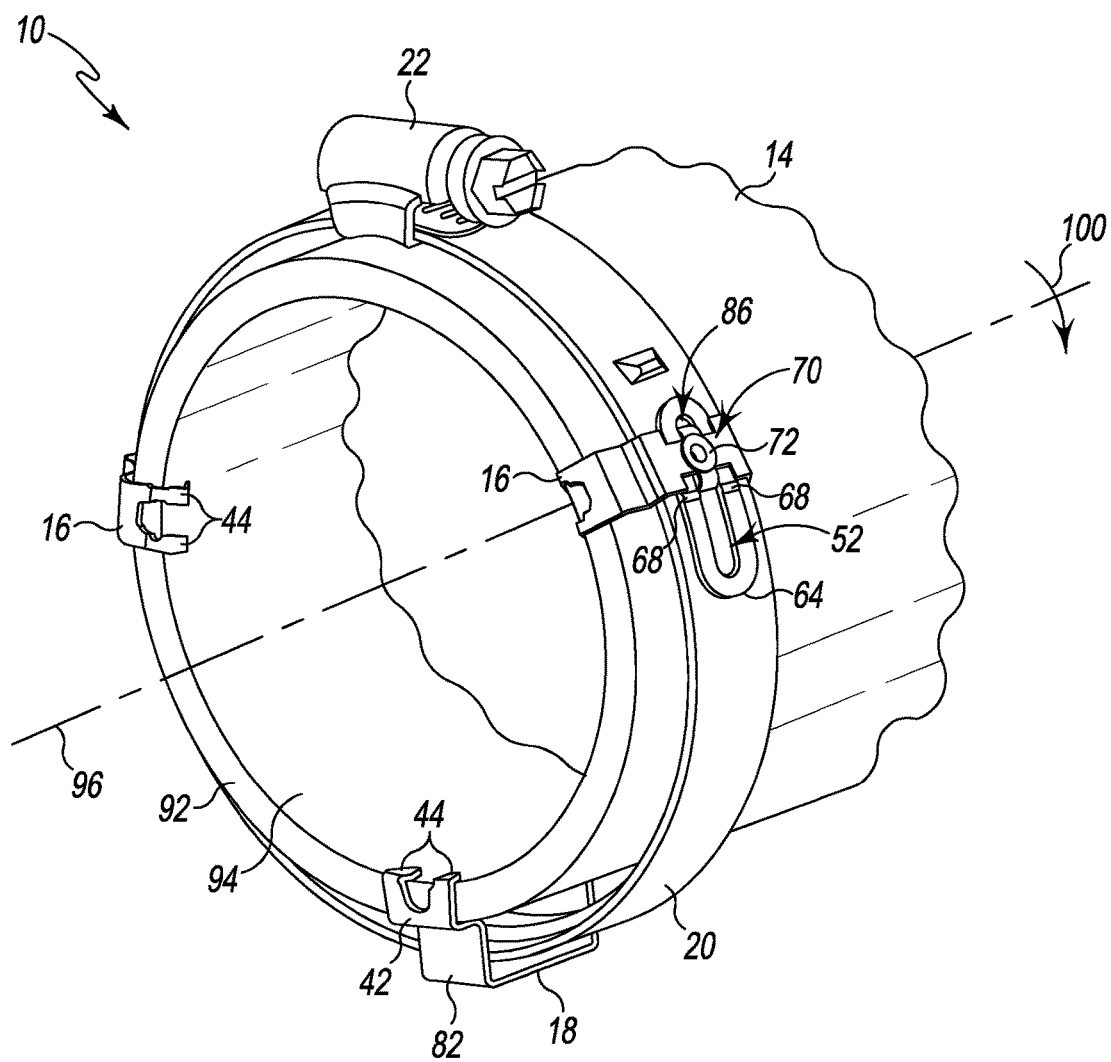
FIG. 5 is an opposing perspective view of FIG. 4.

As shown in FIGS. 4-5, each retainer 16 is secured to the band 20 via an eyelet 70 that extends through the bore 54 defined in the retainer 16. The eyelet 70 includes an outer flange 72 positioned above the outer surface 58 of the band 20 and an inner flange 74 (see FIG. 4A) positioned in the groove 62 defined in the band 20. The flanges 72, 74 cooperate to secure the retainer 16 to the band 20, while also permitting alignment keys 50 (and hence the retainer 16) to slide along the slot 52. In the illustrative embodiment, the eyelet is formed from a metallic material such as, for example, stainless steel, aluminum, copper, or brass. It should be appreciated that in other embodiments a rivet or other fastener may be used to connect each retainer 16 to the band 20.

As described above and shown in FIG. 4, the clamp system 10 also includes a guide bracket 18. In the illustrative embodiment, the guide bracket 18 includes a C-shaped body 80 having a pair of legs 82 that define a channel 84 sized to receive the outer band 20 of the hose clamp 12. Similar to the retainers 16, the bracket 18 includes a clip 42 extending from one of the legs 82. In the illustrative embodiment, the clip 42 includes a pair of pointed tips 44 extending from the leg 82 to engage the hose substrate 14 and attach the retainer 16.

To assemble the system 10, a user may secure the retainers 16 to the hose clamp 12 by aligning the bore 54 and alignment keys 50 of each retainer 16 with the corresponding slot 52 of the hose clamp 12. The user may then advance the alignment keys 50 into the slot 52 before inserting an eyelet 70 into the bore 54. When the eyelet 70 is crimped, the inner flange 74 is formed and the retainer 16 is secured to the hose clamp 12. As shown in FIGS. 4-5, each retainer 16 is initially positioned at one end 86 of each slot 52 such that the hose clamp 12 is maintained at its maximum diameter. The detents 68 formed on the raised sections 64 of the band 20 prevent the retainer 16 from inadvertently advancing along the slot 52 before the tightening process is begun.

With the retainers 16 attached to the hose clamp 12, the user may then align the hose clamp 12 and the retainers 16 with open end 92 of the hose substrate 14. The user may advance the hose clamp 12 axially along a longitudinal axis 96 of the substrate 14 to bring the tips 44 of the each clip 42 into engagement with the inner surface 94 of the hose substrate 14. Each clip 42 is pinched to the hose end 92 to secure the retainers 16 (and hence the clamp 12) to the hose substrate 14. In that way, the hose clamp 12 may be maintained in a predetermined axial position on the substrate 14, while the key 50 and slot 52 arrangement permits the hose clamp 12 to move circumferentially during tightening. It should be appreciated that in other embodiments the retainers 16 may be attached to the hose clamp 12 after the clips 42 (and hence the retainers 16) are already engaged with the substrate 14.

The user may position one or more brackets 18 over the hose clamp 12, as shown in FIGS. 4-5. To secure the bracket 18 to the hose substrate, the user may advance the tips 44 of its clip 42 into engagement with the inner surface 94 of the substrate 14. In the illustrative embodiment, the bracket 18 is positioned radially at the six o'clock position, while the tensioner 22 is positioned at the twelve o'clock position. Each slot 52 is positioned in the illustrative embodiment at the between the one o'clock to three o'clock and nine o'clock and eleven o'clock positions, respectively. When the hose clamp 12 is initially attached to the hose substrate 14 as shown in FIGS. 4-5, the spring liner 34 is offset from the hose substrate 14. It should also be appreciated that any combination of retainers and brackets may be used in the system 10. For example, the system may include a combination of one retainer and two brackets or two retainers and one bracket in a variety of positions around the clamp.

The hose substrate 14 and the system 10 may then be moved to final assembly with a spigot or other component. When the substrate 14 is properly positioned on the component, the user may turn the screw 32 to tighten the clamp 12. As the clamp 12 is tightened, the keys 50 advance over the detents 68 along their respective slots 52 in the direction indicated by arrows 100 to advance the spring liner 34 into engagement with the substrate 14. In the illustrative embodiment, the clamp 12 includes a ramped block 102 that deflects the end 28 of the band 20 above the retainer 16, thereby preventing contact between the end 28 and the retainer 16 or eyelet 72. It should be appreciated that in other embodiments the ramped block 102 may be omitted depending on, for example, the size of the clamp, the position of the slot, and the type of locking mechanism or tensioner.

Figure 6:
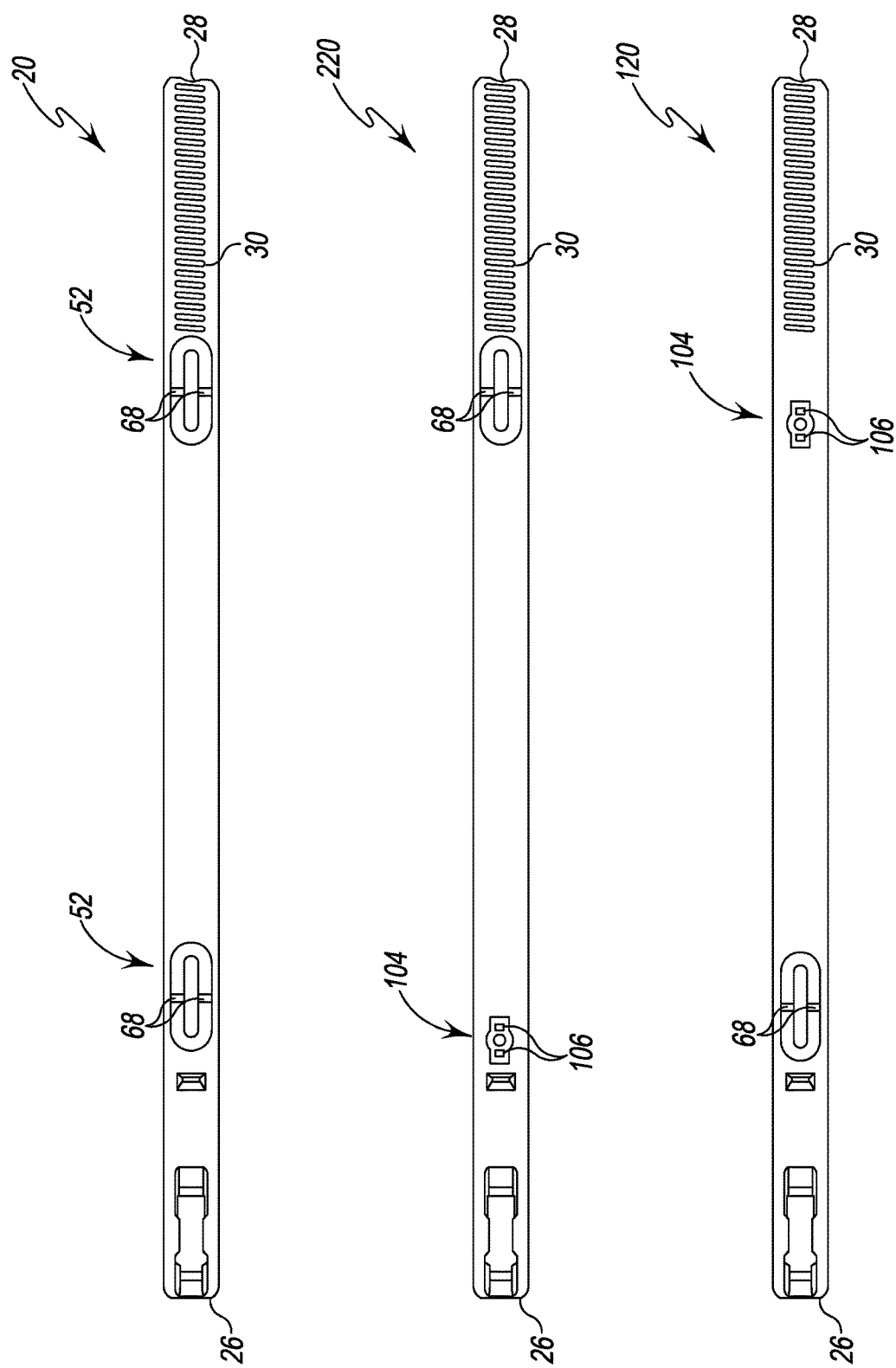
FIG. 6 is a plan view of different embodiments of an outer band of a hose clamp system.

It should be appreciated that in other embodiments the outer band 20 may include only a single slot 52, thereby permitting controlled movement on only one side of the clamp band toward the tensioner 22 position at twelve o'clock. Referring now to FIG. 6, the band 20 is illustrated with other bands 120, 220, which include only a single slot 52 to allow the controlled movement to occur on either end of the clamp by alternating the feature positions. For example, the band 120 has a slot 52 located near its end 28, adjacent the slots 30, thereby permitting controlled movement of only that end of the band 120. The band 220, on the other hand, has a slot 52 located near its end 26, adjacent the position of the tensioner 22, thereby permitting controlled movement of only the end 26. In place of the other slot 52, each of the bands 120, 220 includes a mounting hole 104 sized to receive an eyelet 70 and a pair of slots 106 that are sized to receive the alignment keys 50 of a retainer 16.

Figure 7:
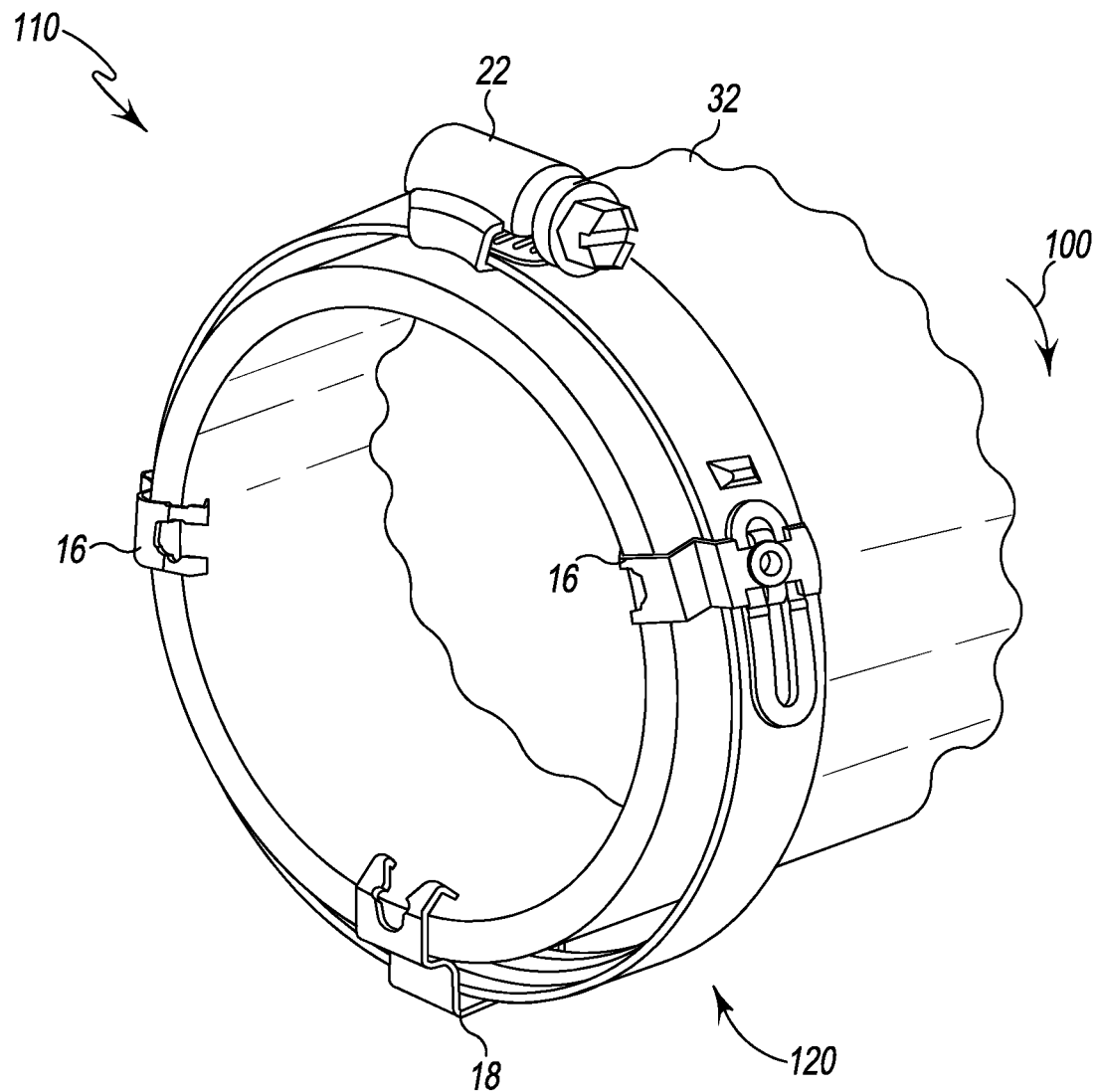
FIG. 7 is a perspective view illustrating another hose clamp system attached to a hose substrate.
Figure 8:
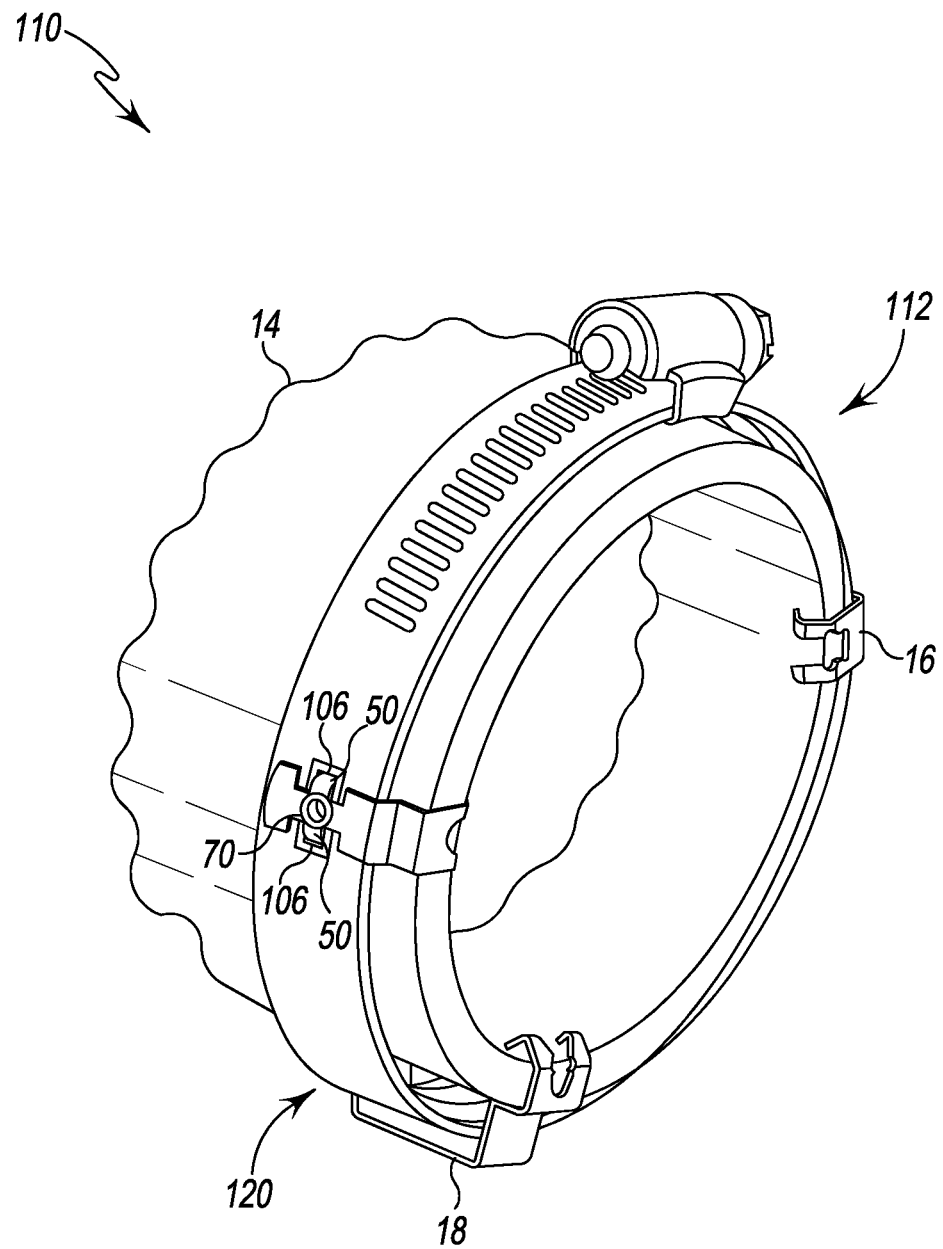
FIG. 8 is an opposing perspective view of FIG. 7.

Referring now to FIGS. 7-8, the band 120 is shown included in a hose clamp 112 of a system 110. Like the system 10 described above, the band 120 includes a number of retainers 16 and a bracket 18, and the band 120 and clamp 112 may be secured to a hose substrate 14 in a manner similar that described above in regard to system 10. In the illustrative embodiment, the bracket 18 is positioned radially at the six o'clock position, while the tensioner 22 is positioned at the twelve o'clock position. The retainer 16 at the one o'clock position in FIG. 7 has its alignment keys 50 positioned in a slot 52, while the other retainer 16 at the nine o'clock position in FIG. 8 has its alignment keys 50 positioned in slots 106 and is fixed in its position by an eyelet 70 extending through mounting hole 104.

When the hose substrate 14 and the system 110 are moved to final assembly with a spigot or other component, the user may turn the screw 32 to tighten the clamp 12. As the clamp 12 is tightened, the keys 50 of the retainer 16 at the one o'clock position advance along their slot 52 in the direction indicated by arrows 100 as the spring liner 34 is advanced into engagement with the substrate 14. The other retainer 16 remains stationary and fixed at its initial position during the tightening process.

Referring now to FIGS. 9-10, the band 220 is shown included in a hose clamp 212 of a system 210. Like the systems 10, 110 described above, the band 220 includes a number of retainers 16 and a bracket 18, and the band 220 and clamp 212 may be secured to a hose substrate 14 in a manner similar that described above in regard to system 10.

In the illustrative embodiment, the bracket 18 is positioned radially at the six o'clock position, while the tensioner 22 is positioned at the twelve o'clock position. The retainer 16 at the eleven o'clock position in FIG. 9 has its alignment keys 50 positioned in a slot 52, while the other retainer 16 at the one o'clock position in FIG. 10 has its alignment keys 50 positioned in the slots 106 and is fixed in its position by an eyelet 70 extending through mounting hole 104.

When the hose substrate 14 and the system 210 are moved to final assembly with a spigot or other component, the user may turn the screw 32 to tighten the clamp 12. As the clamp 12 is tightened, the keys 50 of the retainer 16 at the eleven o'clock position advance along their slot 52 in the direction indicated by arrows 100 as the spring liner 34 is advanced into engagement with the substrate 14. The other retainer 16 remains stationary and fixed at its initial position during the tightening process.

Figure 11:
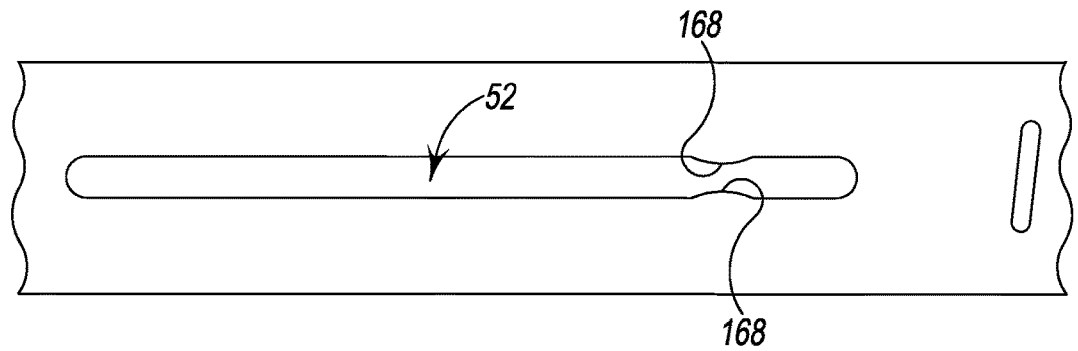
FIG. 11 is a plan view illustrating another embodiment of an outer band.
Figure 12:
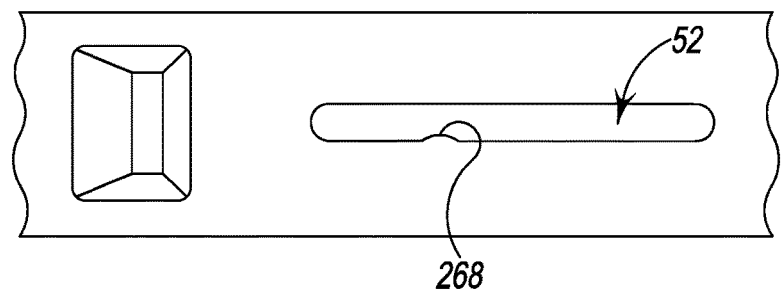
FIG. 12 is a plan view illustrating another embodiment of an outer band.

As shown in FIGS. 1-10, each of the bands 20, 120, 220 include detents 68 to maintain a retainer 16 in a desired position prior to tensioning of the clamp 12. It should be appreciated that detents may be located elsewhere on the bands. For example, as shown in FIG. 11, the detents 168 may extend into the slot 52. As shown in FIG. 12, the band may include only a single detent 268, which extends into the slot 52. In other embodiments, the detent(s) may be formed radially inward or outward. The bands may additional or fewer detents or the detents may also be omitted.

Figure 13:
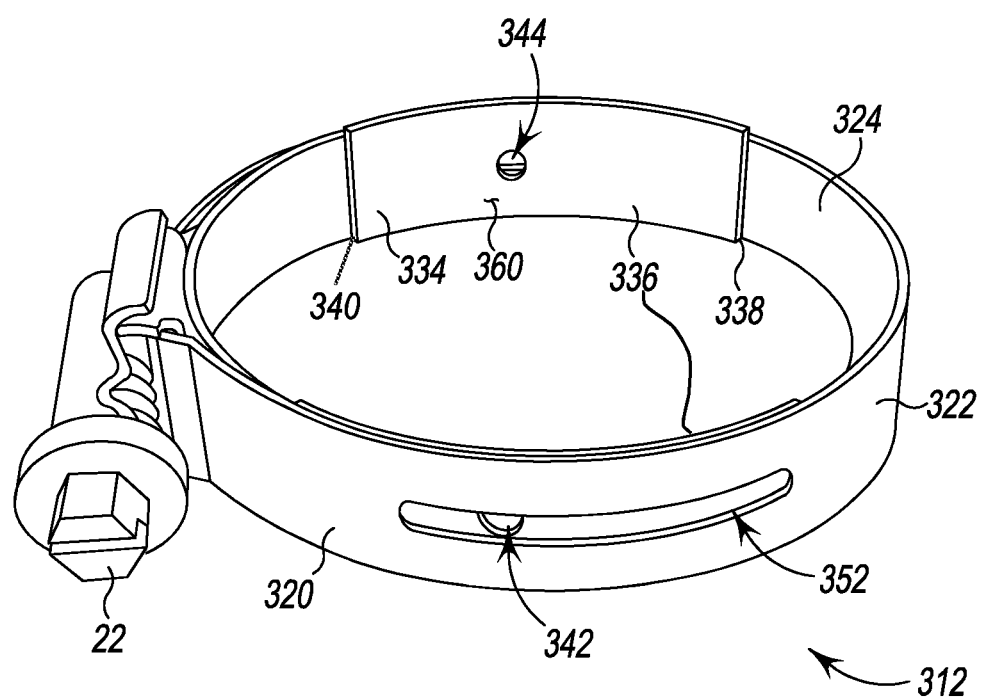
FIG. 13 is a perspective view of another embodiment of a hose clamp system.

Referring now to FIG. 13, another embodiment of a hose clamp system 310 is shown. Some of the features of the system 310 are the same or similar to the system 10 described above. Such features are identified in FIG. 13 with the same reference numbers as those used in FIGS. 1-10. The system 310, like the system 10 described above, is configured to control the circumferential and axial position of a hose clamp relative to a hose substrate (such as an elastomeric or thermoplastic hose or duct) before final assembly with a spigot, fitting, or other component. The system 310 includes a hose clamp 312 and a number of retainers 16 (not shown in FIG. 13), which are configured to position the hose clamp 12 on a substrate.

The clamp 312 includes an outer band 320 and a locking mechanism 22 configured to apply tension the outer band 320. The outer band 320 is formed from a metallic material such as, for example, a stainless steel, titanium, aluminum, any ferrous material, and any non-ferrous material. The outer band 320 is secured to the locking mechanism or tensioner 22 in a manner similar to that described above in regard to the outer band 20. The outer band 320 includes a radial outer surface 322 and an annular inner surface 324 that is positioned opposite the outer surface 322.

As shown in FIG. 13, the clamp 312 also includes a liner 334 that extends partially around the annular inner surface 324 of the outer band 320. The liner 334 is illustratively formed as a pair of strips 336 of metallic material such as, for example, a stainless steel, titanium, aluminum, any ferrous material, and any non-ferrous material. Each strip 336 extends from one end 338 to an opposite end 340. Each strip 336 has one through-hole 342, 344 defined therein, in the illustrative embodiment. As described in greater detail below, each of the holes 342, 344 is sized to receive an eyelet 70 (not shown in FIG. 13). It should be appreciated that in other embodiments the liner may be a single strip or include additional strips.

Similar to the band 20 described above, the outer band 320 includes a pair of elongated slots 352 that extend circumferentially through the surfaces 322, 324. Each slot 352 is positioned in the illustrative embodiment at the between the one o'clock to three o'clock and nine o'clock and eleven o'clock positions, respectively. It should be appreciated that in other embodiments the band may include only a single elongated slot, similar to the band 120 or the band 220 described above. As shown in FIG. 13, each strip 336 has a length greater than the length of the corresponding slot 352 to prevent substrate material from extruding into the slots and prevent pinching of the substrate material on the trailing edge.

Each retainer 16 may be secured to the band 320 via an eyelet 70 that extends through the bore 54 defined in the retainer 16. The eyelet 70 includes an outer flange 72 positioned above the outer surface 322 of the band 320. Each eyelet 70 extends through one of the slots 352 and into one of the through-holes 342, 344 of the liner 334. Each eyelet 70 also includes an inner flange 74 that engages the inner surface 360 of the liner 334. In that way, the flanges 72, 74 cooperate to secure the retainer 16 to the band 20, while also permitting alignment keys 50 (and hence the retainer 16) to slide along the slots 52.

To assemble the system 310, a user may secure the retainers 16 to the hose clamp 312 by aligning the bore 54 and alignment keys 50 of each retainer 16 with the corresponding slot 352 of the hose clamp 312 and the corresponding through-hole 342 or 344 of the liner 334. The user may then advance the alignment keys 50 into the slot 352 before inserting an eyelet 70 into the bore 54 of the retainer 16 and into the corresponding through-hole of the liner 334. When the eyelet 70 is crimped, the inner flange 74 is formed and the retainer 16 is secured to the hose clamp 312 and the liner 334. The hose clamp 312 may then be tightened in the manner described above, and the clamp 312 is maintained in its axial position relative to the substrate by the retainers 16.

The embodiments described above attach clamps to hose substrates such that a desired radial, axial and circumferential position relative to the substrate outer diameter and hose end is maintained. The systems illustratively permit circumferential movement of the clamp band relative to the underlying hose by means of an eyeletted slide and multiple configurations of fixation retainers. It will be appreciated that the devices and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

Figure 14:
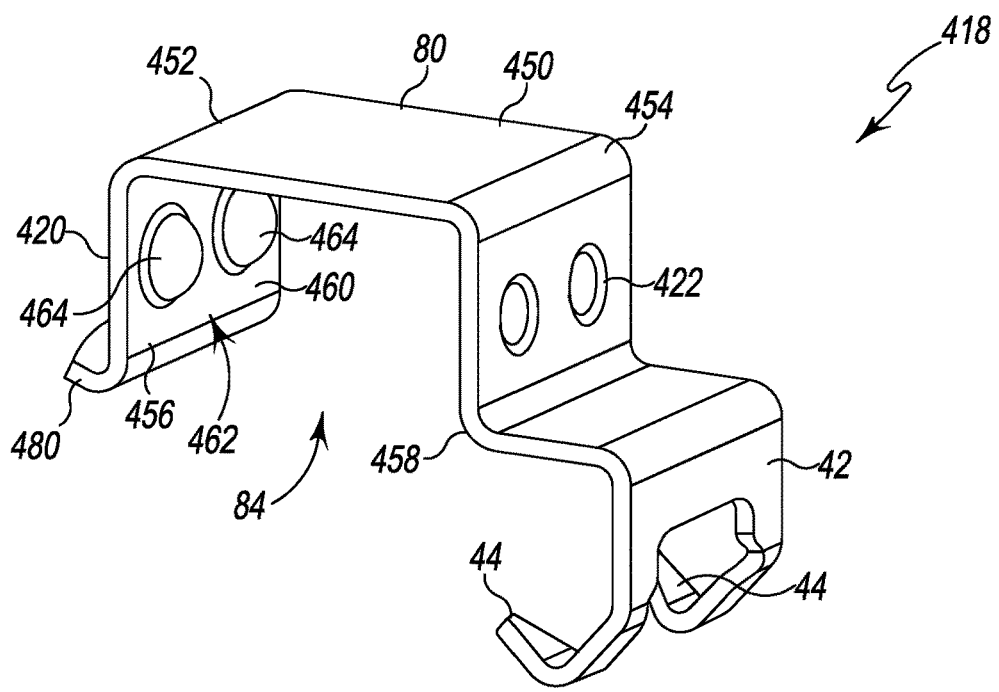
FIG. 14 is a perspective view illustrating one embodiment of a guide bracket for use in the hose clamp systems of FIGS. 1-13.

Referring now to FIG. 14, another embodiment of a guide bracket (referred to herein as a guide bracket 418) is shown. Similar to the guide bracket 18 described above, the guide bracket 418 is configured to be positioned over the clamp 12 when the clamp 12 is attached to the hose substrate 14. Many features of the guide bracket 418 are the same as or similar to those described above in regard to bracket 18, and such features will be identified using the same reference numbers. In the illustrative embodiment, the guide bracket 418 includes an elongated, C-shaped body 80 having a pair of legs 82 (identified as legs 420, 422) that define a channel 84 sized to receive the outer band 20 of the hose clamp 12. Similar to the retainers 16, the bracket 418 includes a clip 42 extending from the leg 422. In the illustrative embodiment, the clip 42 includes a pair of pointed tips 44 extending from the leg 82 to engage the hose substrate 14 and attach the retainer 16.

The body 80 is formed from a strip of metallic material such as, for example, a stainless steel or aluminum. The elongated body 80 includes an outer section 450 that extends between ends 452, 454. One leg 420 of the bracket 418 extends from the end 452 of the outer section 450 to a lower end 456. The other leg 422 of the bracket 418 extends from the opposite end 454 of the outer section 450 to a lower end 458. In the illustrative embodiment, the legs 420, 422 extend substantially orthogonal to the outer section 450 of the body 80 to form the channel 84. It should be appreciated that in other embodiments the legs 420, 422 and/or body may be curved or slanted. The lower ends 456, 458 of the legs 420, 422 are configured to engage the hose substrate 14 such that the outer section 450 of the body 80 is spaced radially outward from the substrate 14.

As shown in FIG. 14, the leg 420 has an inner surface 460 that faces the leg 422. The bracket 418 includes a detent 462 that extends from the inner surface 460 into the channel 84. As described in greater detail below, the detent 462 is configured to engage the outer band 20 of the clamp 12 such that the outer band 20 is spaced apart from the substrate 14 during the assembly process. In the illustrative embodiment, the detent 462 includes a pair of dome-shaped tabs 464 formed in the leg 420.

Figure 15:
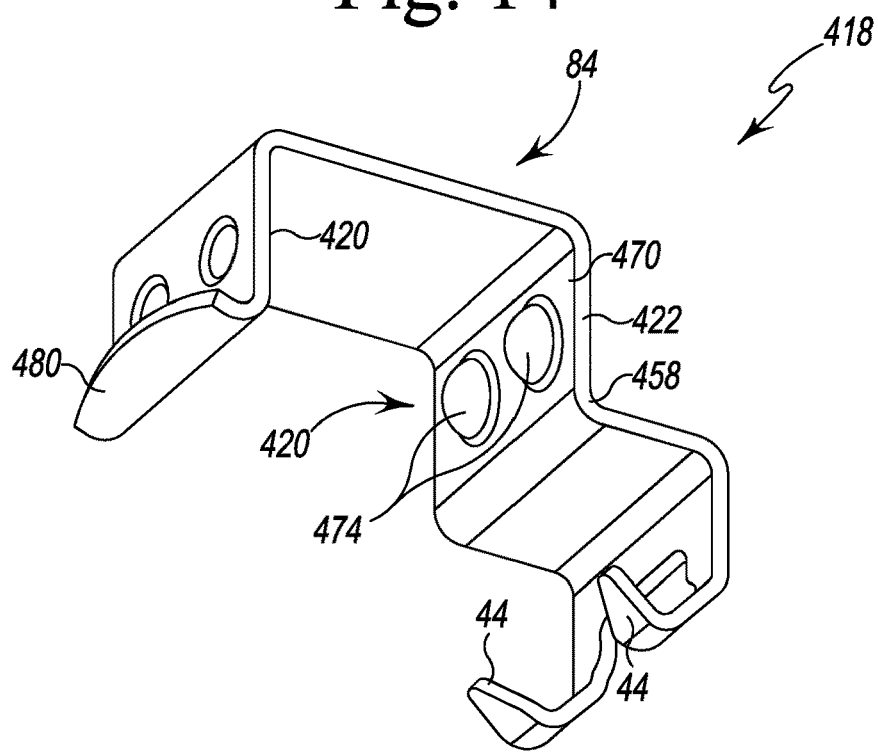
FIG. 15 is another perspective view of the guide bracket of FIG. 14.
Figure 18:
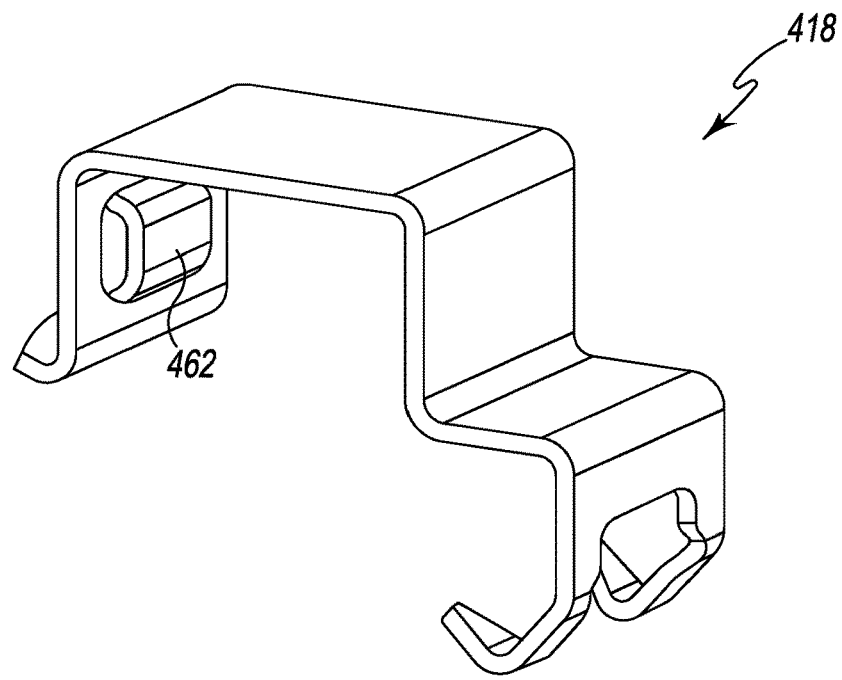
FIG. 18 is a perspective view illustrating another embodiment of a guide bracket.

As shown in FIG. 15, the leg 422 has an inner surface 470 that faces the leg 420. The bracket 418 includes a detent 472 that extends from the inner surface 470 into the channel 84. Similar to the detent 462, the detent 472 is configured to engage the outer band 20 of the clamp 12 such that the outer band 20 is spaced apart from the substrate 14 during the assembly process. In the illustrative embodiment, the detent 472 includes a pair of dome-shaped tabs 474 formed in the leg 422. It should be appreciated that in other embodiments the detents may take the form of a single dome-shaped tab or other suitable shapes to retain the outer band of the clamp in position relative to the substrate. For example, as shown in FIG. 18, the detent 462 may take the form of one or more rectangular tabs 478.

As shown in FIGS. 14-15, the bracket 418 also includes a curved flange 480 that extends from the lower end 456 of the leg 420. In the illustrative embodiment, the curved flange 480 is configured to abut the hose substrate 14.

The user may position one or more brackets 418 over the hose clamp 12, as described above. To secure the bracket 418 to the hose substrate, the user may advance the tips 44 of its clip 42 into engagement with the inner surface 94 of the substrate 14. In one embodiment, the bracket 418 may be positioned radially at the six o'clock position, while the tensioner 22 of the clamp 12 may be positioned at the twelve o'clock position. It should be appreciated that in other embodiments the bracket may be positioned at other positions around the clamp 12.

Figure 16:
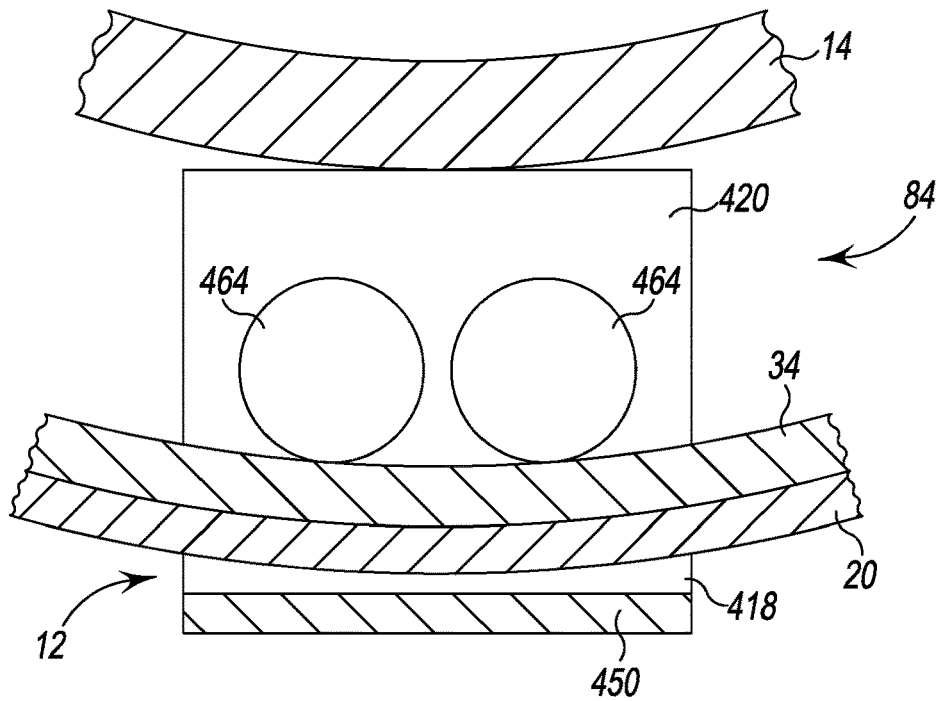
FIG. 16 is a cross-sectional view illustrating an annular band of the hose clamp systems of FIGS. 1-13 in a position relative to the guide bracket of FIG. 14.

During assembly, the clamp 12 is adjustable between a plurality of diameters. When the hose clamp 12 is initially attached to the hose substrate 14 as shown in FIG. 16, the spring liner 34 and the outer band 20 are offset from the hose substrate 14. In that position, the spring liner 34 and the outer band 20 have an initial diameter, and a segment 482 of the outer band 20 is positioned in the channel 84 between the detents 462, 472 and the outer section 450 of the bracket 418. In that position, the detents 462, 472 cooperate to prevent the spring liner 34 and the band 20 from inadvertently advancing radially inward before the process of tightening the band 12 to the hose substrate 14 has begun.

Figure 17:
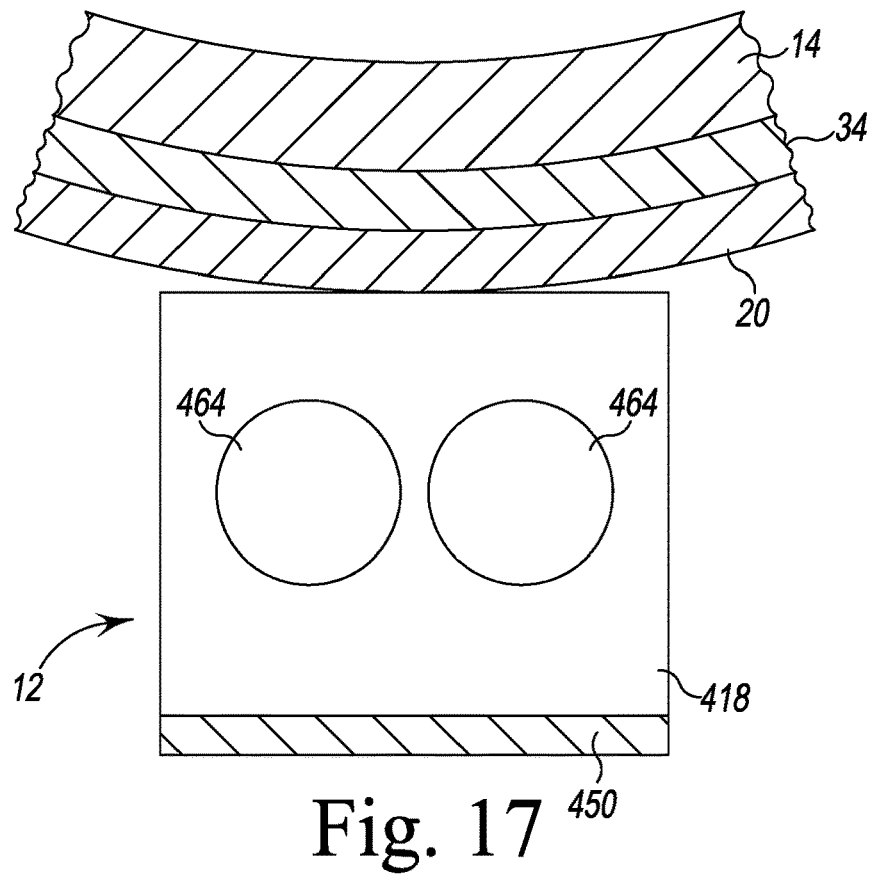
FIG. 17 is similar to FIG. 16 showing the annular band in another position relative to the guide bracket.

During the assembly process, the assembler may tighten the band 12 with sufficient force to advance the spring liner 34 and the band 12 radially inward, over the detents 462, 472, and into contact with the hose substrate 14, as shown in FIG. 17.

Figure 19:
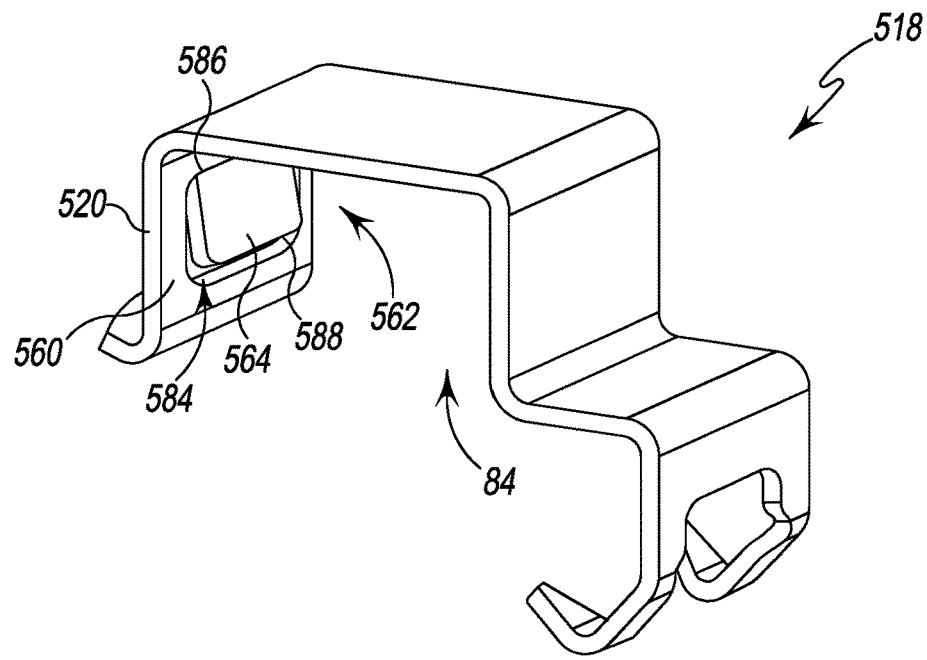
FIG. 19 is a perspective view illustrating another embodiment of a guide bracket.

Referring now to FIG. 19, another embodiment of the guide bracket (hereinafter bracket 518) is shown. Similar to the guide bracket 418 described above, the guide bracket 518 is configured to be positioned over the clamp 12 when the clamp 12 is attached to the hose substrate 14. Many features of the guide bracket 518 are the same as or similar to those described above in regard to bracket 418, and such features will be identified using the same reference numbers. The bracket 518 includes another detent 562 that includes a cantilevered tab 564. The cantilevered tab 564 is positioned in a slot 584 formed in one of the legs 420 and extends from an inner surface 560 of the leg 420 into the channel 84. The cantilevered tab 564 extends from a radially outer end 586 that is flush with the inner surface 560 of the leg 420 radially inward to a cantilevered end 588 that extends into the channel 84. The cantilevered tab 564 is configured to engage the outer band 20 of the clamp 12 such that the outer band 20 is spaced apart from the substrate 14 during the assembly process until tightening the clamp 12 causes the outer band 20 to overcome the spring force exerted by the cantilevered tab 564. It will be appreciated that the cantilevered tab 564 may be included on either one or both of the legs 420, 422.

It will be appreciated that the eyelet and alignment key configuration of the retainer described in, for example, reference to FIG. 1 may not be present in some embodiments that include the beforementioned guide bracket with detents. Some embodiments that include a guide bracket may not include a retainer, and some embodiments that include a retainer may not include a guide bracket.

It will be appreciated that the devices and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A hose clamp system comprising:
    an annular band including a radial inner surface facing toward a central axis and a radial outer surface positioned opposite the radial inner surface,
    a liner positioned radially inward from the annular band, the liner defining an inner diameter,
    a tensioner configured to tighten the annular band and reduce the inner diameter of the liner, and
    a retainer including an elongated body extending over the radial outer surface of the annular band and a clip extending outward from the annular band, the clip being configured to engage a hose substrate, wherein the retainer is moveably coupled to the annular band such that the retainer is permitted to move circumferentially along the radial outer surface of the annular band.

2. The hose clamp system of claim 1, wherein the elongated body extends parallel to the central axis of the annular band.

3. The hose clamp system of claim 1, wherein:
the annular band has an elongated slot extending through the radial outer surface, and
the retainer includes an alignment key that is received in the slot and is configured to move along the slot when the retainer is moved circumferentially along the radial outer surface of the annular band.

4. The hose clamp system of claim 3, further comprising an eyelet configured to retain the alignment key in the elongated slot.

5. The hose clamp system of claim 4, wherein the annular band includes a groove defined in the radial inner surface, the groove being sized to receive an inner flange of the eyelet.

6. The hose clamp system of claim 3, wherein the annular band includes a detent sized to retain the alignment key at an end of the elongated slot.

7. The hose clamp system of claim 6, wherein the detent extends outwardly from the radial outer surface.

8. The hose clamp system of claim 6, wherein the alignment key is positioned between a channel defined in the retainer to permit the retainer to bend during installation.

9. The hose clamp system of claim 1, further comprising a ramp block positioned between an end of the annular band and the retainer, the ramp block being sized to prevent an opposite end of the annular band from engaging the retainer.

10. A hose clamp system comprising:
an annular band including a radial inner surface facing toward a central axis and a radial outer surface positioned opposite the radial inner surface,
a tensioner configured to tighten the annular band, and
a retainer including an elongated body extending over the radial outer surface of the annular band and a clip extending outward from the annular band, the clip being configured to engage a hose substrate,
wherein the retainer is moveably coupled to the annular band such that the retainer is permitted to move circumferentially along the radial outer surface of the annular band.

11. The hose clamp system of claim 10, wherein the elongated body extends parallel to the central axis of the annular band.

12. The hose clamp system of claim 10, wherein:
the annular band has an elongated slot extending through the radial outer surface, and
the retainer includes an alignment key that is received in the slot and is configured to move along the slot when the retainer is moved circumferentially along the radial outer surface of the annular band.

13. The hose clamp system of claim 12, further comprising an eyelet configured to retain the alignment key in the elongated slot.

14. The hose clamp system of claim 13, wherein the annular band includes a groove defined in the radial inner surface, the groove being sized to receive an inner flange of the eyelet.

15. The hose clamp system of claim 12, wherein the annular band includes a detent sized to retain the alignment key at an end of the elongated slot.

16. The hose clamp system of claim 15, wherein the detent extends outwardly from the radial outer surface.

17. The hose clamp system of claim 15, wherein the alignment key is positioned between a channel defined in the retainer to permit the retainer to bend during installation.

18. The hose clamp system of claim 10, further comprising a ramp block positioned between an end of the annular band and the retainer, the ramp block being sized to prevent an opposite end of the annular band from engaging the retainer.

19. A hose clamp system comprising:
an annular band including a radial inner surface facing toward a central axis and a radial outer surface positioned opposite the radial inner surface,
a tensioner configured to tighten the annular band, and
a retainer including (i) a liner positioned along the radial inner surface of the annular band and (ii) a fastener coupling the liner to the annular band,
wherein relative circumferential movement between the annular band and the retainer is permitted.

20. The hose clamp system of claim 19, wherein:
the annular band has an elongated slot extending through the radial outer surface, and
the fastener extends through the slot and is configured to move along the slot when the retainer is moved relative to the annular band.

* * * * *